United States Patent [19]

Spooner et al.

[11] 4,145,712
[45] Mar. 20, 1979

[54] LASER-ELIMINATION OF MODE BEATING

[75] Inventors: Archer M. Spooner, South Nutfield; Daniel R. Lobb, Farnborough, both of England

[73] Assignee: Redifon Flight Simulation Limited, Crawley, England

[21] Appl. No.: 772,423

[22] Filed: Feb. 28, 1977

[30] Foreign Application Priority Data

Jul. 22, 1976 [GB] United Kingdom ............... 30557/76

[51] Int. Cl.$^2$ .................................................. H04N 9/31
[52] U.S. Cl. .................................................. 358/60
[58] Field of Search .................... 358/60, 61; 350/169, 350/173, 174

[56] References Cited

U.S. PATENT DOCUMENTS

| | | | |
|---|---|---|---|
| 3,383,460 | 5/1968 | Pritchard | 358/61 |
| 3,569,988 | 3/1971 | Schmidt et al. | 358/60 |
| 3,710,015 | 1/1973 | Fowler | 358/61 |

*Primary Examiner*—Richard Murray
*Attorney, Agent, or Firm*—Larson, Taylor and Hinds

[57] ABSTRACT

A laser system designed to minimize mode beating by splitting an incident laser beam into two approximately equal components, transmitting the components along separate paths of unequal lengths and recombining the components at a beam combiner to form the emergent laser beam. Laser mode beating is effected at frequencies dependent upon the interferometric path difference. Mode beating elimination at further frequencies is possible using further splitter/combiner combinations in series. A three-color laser modulator uses two different laser sources, each with splitter/combiner mode beating suppression optics. One beam is further split to provide, in all, three paths through three color modulators, the three paths being combined at a dichroic combiner. A color laser projection display system includes conventional line and frame scanning means following the dichroic combiner of the three-color modulator.

8 Claims, 3 Drawing Figures

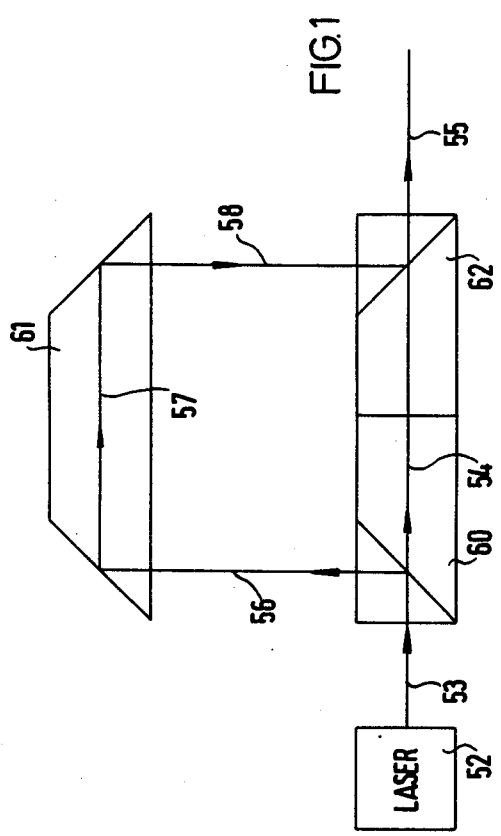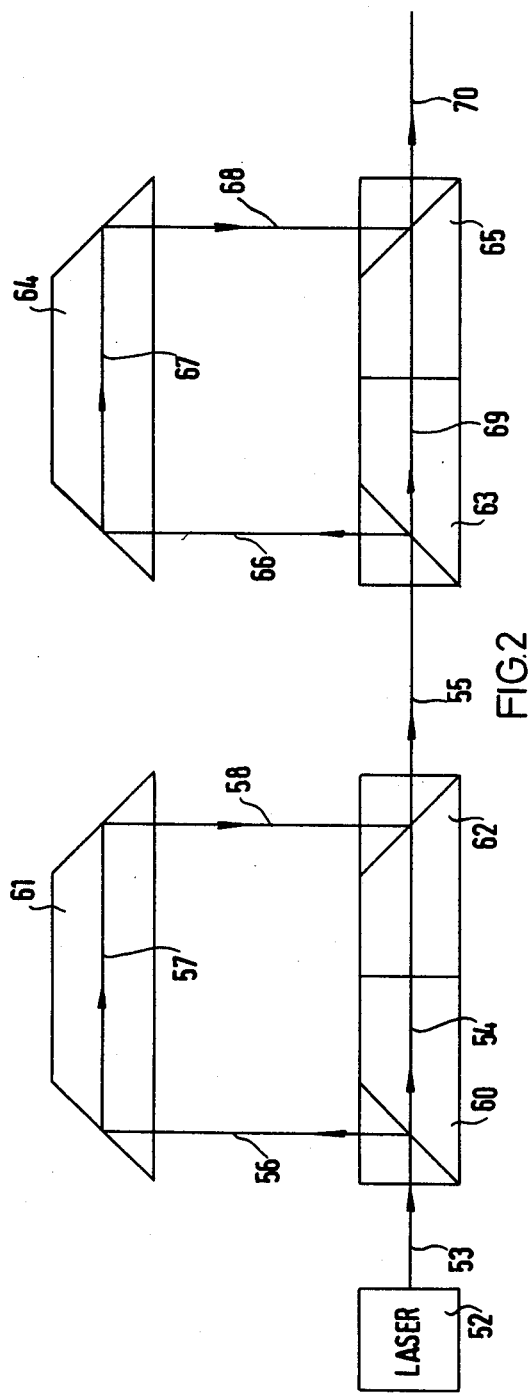

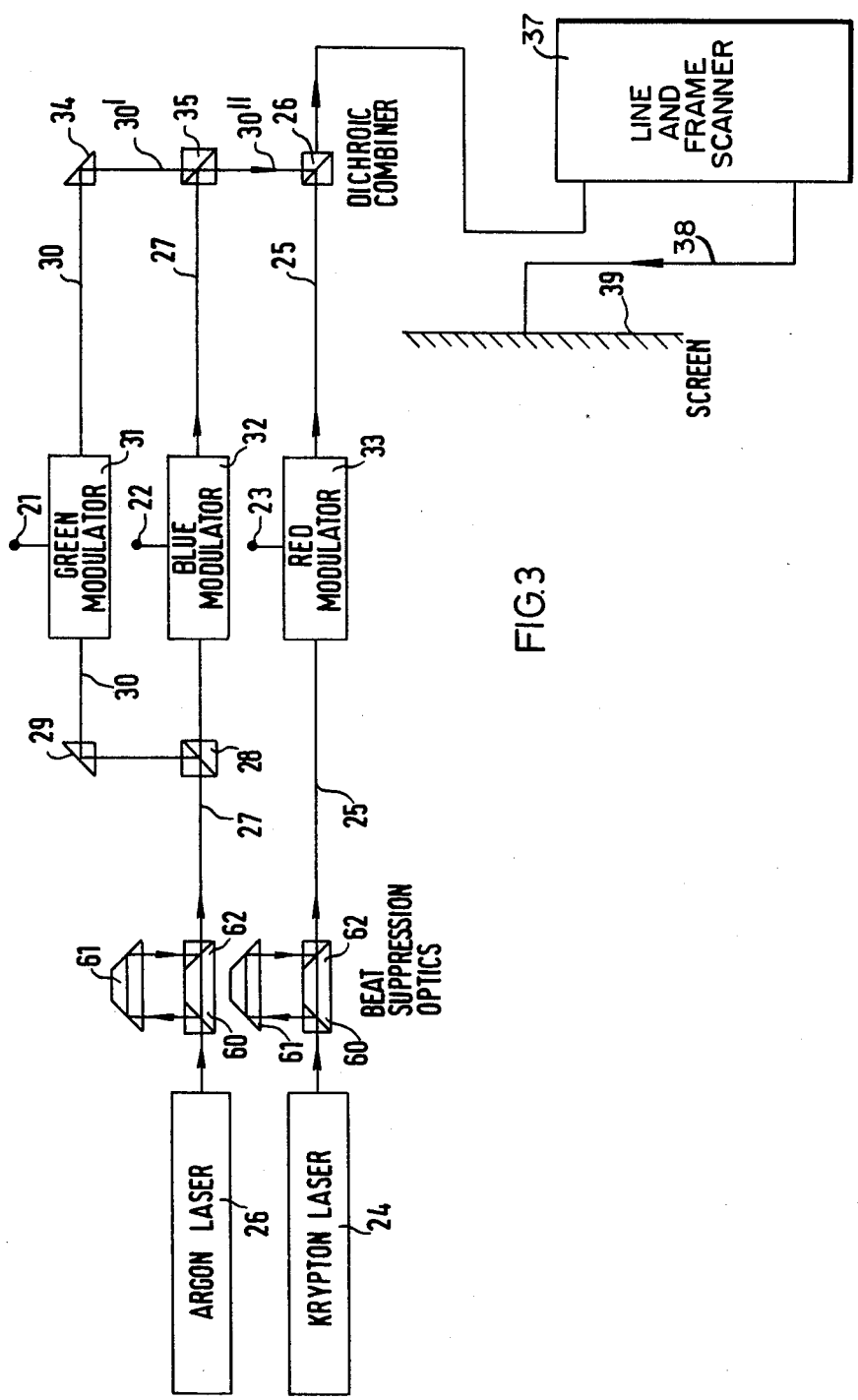

LASER-ELIMINAION OF MODE BEATING

The U.S. Goverment has rights in this invention pursuant to Contract No. N61339-76-C-0018 Awarded by the U.S. Naval Training Equipment Centre, Orlando, Fla.

This invention relates to laser systems.

It is well known that a beam of light which is propagated along the optical axis of a laser will, if sufficient gain is provided in the system, emerge from the laser output mirror in the so-called uniphase mode, which is manifest as a single output beam having a Gaussian energy distribution of any diameter orthogonal to the laser axis.

However, the output energy of any laser may not be confined to this desirable mode but may include both transverse and axial modes.

Transverse modes are manifest as a non-Gaussian distribution of laser energy, resulting in a beam which cannot be focused at a point. Whereas, laser systems are obtainable in which the lasers oscillate solely in the uniphase mode, the presence of axial modes is more likely. Axial, that is longitudinal, modes are due to standing wave patterns of energy in the direction of the laser axis and these modes are manifest as a non-linear laser energy output with respect to time.

Expressed otherwise, the laser energy output, instead of being confined to the single frequencies of discrete spectral lines, will comprise a group of frequencies around each such spectral line. Moreover, the frequencies present will produce so-called mode beating which may modulate the beam intensity up to 100%.

The present invention is particularly, but not solely, concerned with systems for generating and for projecting a visual disply using laser scanners, for example for a ground-based flight simulator, and the invention will be particularly described with reference to such application. In such a system, it is necessary to achieve as high a signal-to-noise ratio as possible and laser beam noise, in the form of the fluctuation in time of the laser energy output, due to mode-beating as described, is a serious source of noise in the system.

In an image generating system using a laser camera, the noise generated by such mode beating can be eliminated by using a notch filter in the video channel. This expedient is not possible in a scanned laser display system and the invention is therefore more particularly concerned with the scanned laser display portion of an overall visual display system.

The object of the present invention is to provide a laser system, and hence a visual display system as described, having low inherent laser beam noise due to mode beating.

Accordingly, one form of the invention provides a laser system comprising a laser beam source and an optical system for transmitting the lower beam and comprising a beam splitter for splitting the incident laser beam into two approximately equal components, optical means for directing the two componenets along optical paths of unequal lengths and a beam combiner for combining the two components after travel along their unequal paths, to form a single emergent laser beam.

Alternatively, the system may include two or more beam-splitting and beam-recombination optical elements systems, of the form defined, in series.

Another form of the invention provides a display system as defined above including a laser system as defined in either one of the last two preceding paragraphs.

In order that the invention may be more clearly understood and readily carried into practice, two embodiments will now be described in detail, by way of example, with reference to the accompanying drawings, in which:

FIG. 1 is a diagram of optical apparatus including beam-splitting and beam-recombination elements defining alternative beam-paths of different length from each other.

FIG. 2 is a diagram of a laser system having an optical system for transmitting the laser beam which comprises first and second beam-splitting and beam-recombination elements; and FIG. 3 is a block schematic diagram of a laser display projector which includes a three-colour laser modulator with two laser beam sources, each including a beam-splitting and beam-recombination optical system as shown in FIG. 1.

Referring first to FIG. 1 of the drawings, there is shown a polarising beam splitter 60, a prism 61 and a polarising beam combiner 62. The entry beam path 53 from laser 52 is split into a first path part 54 continuing through the beam splitter 60 and beam combiner 62 and continuing as emergent path 55. The second path comprises a deflected part 56 emergent from the beam splitter 60, a part 57 extending through the prism 61 and a part 58 emergent from prism 61 and entering the beam combiner 62, where it rejoins the emergent path part 55. Assuming a rectangular physical configuration of the two paths and equal propagation velocity in the prism 61 as in the beam splitter and combiner 60, 62, the beam path parts 56 and 58 are together made equal to the cavity length of laser 52.

The beam splitter 60 gives substantially complete transmission of one plane polarised component of the incident beam and substantially complete reflection of the orthogonally polarised component of the incident beam, and the beam combiner 62 gives substantially complete deflection of the two incident, orthogonally polarised, beam components into a single output beam.

An optical system as described with reference to FIG. 1 is used to eliminate, or greatly to reduce, the effect of laser mode beating at frequencies:

$$nC/2L$$

where
n is any odd positive integer,
C is the velocity of light, and
L is the interferometric path difference between the two paths of unequal length.

In an arrangement using in series two or more optical systems as shown in FIG. 1, it is possible to eliminate, or greatly to reduce, the effects of laser mode beating at other groups of beat frequencies, according to the different interferometric paths used. Preferably, where two or more optical systems are used in series, the component polarisation direction defined by an optical system are at 45° to the component polarisation directions defined by the preceding optical system.

FIG. 2 shows such a system. The laser system of FIG. 2 comprises a laser beam source 52 followed by two beam-splitting, beam-recombination systems of the form shown in FIG. 1. Thus the optical system comprises the first beam splitter 60 for splitting the laser beam entering along path 53 into first and second approximately equal components which travel respectively along first and second paths 54 and 56, respectively. The second path 56 includes the prism 61 which directs the second component along path parts 57 and 58 to a first beam combiner 62. The first path 54 is also directed to the beam combiner 62 but is shorter than the path 56, 57 and 58. A single laser beam emerges from the beam combiner 62 along path 55 which path enters a second beam splitter 63 for splitting the laser beam entering along path 55 into third and fourth approximately equal components which travel respectively along third and fourth paths 69 and 66, respectively. The fourth path includes a second prism 64 which directs the fourth component along path parts 67 and 68 to a second beam combiner 65. The third path 69 is also directed to the beam combiner 65 but is shorter than the path 66, 67 and 68. A single laser beam emerges from the beam combiner 65 along path 70. It will be noted that the difference between the first path 54 and the second path 56, 57 and 58 is not equal to the difference between the third path 69 and the fourth path 66, 67 and 68.

In the laser system shown in FIG. 2, the first and second component polarisation, defined by the first optical means, is at 45° to the third and fourth component polarisation, defined by the second optical means.

In the use of the invention in an overall visual display system including an image generating system and a scanned laser display system, an image generating system of known form may be used, a notch filter being included in the video channel thereof to eliminate the effects of laser mode beating in this part of the system.

A scanned laser projection display system will now be described with reference to the block schematic diagram of FIG. 3.

FIG. 3 shows a krypton laser 24 which defines a laser beam path 25 and an argon laser 26 which defines a laser beam path 27. The path 27 is directed into a beam-splitter 28 and prism 29 combination which defines a third laser beam path 30. The paths 30, 27 and 25 are respectively directed through "Green," "Blue" and "Red" beam amplitude modulators 31, 32 and 33 respectively supplied with Green, Blue and Red video signals at terminals 21, 22 and 23 respectively. Emergent path 30 is deflected at 30' into a dichroic combiner 35 into which emergent path 26 is also directed, so that both are aligned on path 30, which is directed into a dichroic combiner 36, as is also emergent path 25.

The emergent beam from the dichroic combiner 36 is scanned by a line and frame scanner 37, as beam 38, to provide the projected display on a projection screen 39.

In the system of FIG. 3, as so far described, the main source of noise is laser beam noise. Hence, effective means for reducing laser beam noise in the scanned laser display system of FIG. 3 will improve the signal-to-noise ratio in the overall system.

Certain noise present in laser systems is in a low frequency band and this noise can be eliminated by the use of automatic power compensation systems. Such compensation would be used in a practical system according to FIG. 3.

Laser beam noise due to the mode beating described above lies in a high frequency band and is not eliminated by automatic power compensation systems.

In general, a laser will produce multiple axial, or longitudinal, modes and these are known to correspond exactly to the series of frequencies: $C/2L$, $C/L$, $3C/2L$, and so on, where C is the velocity of light and L is the length of the laser cavity. High power argon lasers are of some two meters in length, so that the fundamental frequency, defined as $C/2L$ above is some 87 MHZ. This frequency lies within the bandwidth of 0 to 100 MHZ likely to be used in a system such as that of FIG. 3 and, unless suppressed, would result in a high-contrast, fine line pattern covering the entire field of the display. A lower power argon laser of shorter length might result in modulation at a frequency of some 140 MHZ, which would still result in a visible line pattern in the display.

It has previously been proposed to use an intracavity etalon which is adjusted in order to suppress all but the desired lasing mode. However, the resultant power loss is some 40% to 60% of the output power otherwise obtainable.

The present invention provides a preferred method of beat suppression in such a system and it will be noted from FIG. 3 that the system includes two optical systems of the form described with reference to FIG. 1, one in the path 25 of the krypton laser 24, the additional path length being made equal to the cavity length of laser 24, and the second arrangement being in the path 27 of the argon laser 26, the additional path length being made equal to the cavity length of laser 26.

The beat suppression optic shown in FIG. 3 are of the form shown in FIG. 1, for simplicity but each of the elements 60, 61 and 62, following the argon laser 26 and the krypton laser 24 respectively, may contain the components 60, 61, 62, 63, 64 and 65, of the arrangement shown in FIG. 2.

The energy loss in the beat suppression arrangement of FIG. 1 is some 2% to 5% only, that is, less than one-tenth that of the arrangement using an intra-cavity etalon.

Against this advantage, the arrangement of FIG. 1 has the potential disadvantage of effectively depolarising the laser beam. Electro-optic modulators require a polarised light input. This fact necessitates that, if the modulator or modulators follow the dichroic combiner 62 of the beat suppression optics, the modulators used must be of the acousto-optic type. If, nevertheless, it is required to use modulators of the electro-optic type, it is necessary to introduce them within the beat suppression optical arrangements after the beam splitter 60, causing both beam parts to pass through the modulator along geometrically separate paths and locating the beam combiner 62 following the modulator. This latter arrangement is not illustrated in the drawings.

In consequence of the additional complexity required if electro-optic modulators are used, the preferred arrangement of FIG. 3 uses acousto-optic modulators for the three modulators 31, 32 and 33.

We claim:

1. A laser system comprising a laser beam source and an optical system for transmitting the laser beam and comprising a beam splitter for splitting the incident laser beam into two approximately equal components, optical means for directing the two components along optical paths of unequal lengths and a beam combiner for combining the two components, after travel along their unequal length paths, to form a single emergent laser beam, in which the said optical system for transmitting the laser beam comprises a first beam splitter for splitting the incident laser beam into first and second approximately equal components, first optical means for directing the first and second components respectively along first and second optical paths of unequal lengths and a first beam combiner for combining the first and second components, after travel along the first and second respective paths, to form a single first emergent laser beam and at least a second beam splitter for splitting the first emergent laser beam into third and fourth approximately equal components, second optical means for directing the third and fourth components respectively along third and fourth optical paths of unequal lengths and a second beam combiner for combining the third and fourth components, after travel along the third and fourth respective paths, to form a single second emergent laser beam, the difference between the first and second optical paths being unequal to the difference between the third and fourth optical paths, and in which the interferometric path difference between the first and second paths is selected to have a value L1, whereby the effect of laser mode beating is reduced at the series of frequencies "f," defined by the expression:

$$f = nC/2\ L1,$$

where
n is any positive integer,
C is the velocity of light, and
L1 is the selected path difference above defined.

2. A laser system as claimed in claim 1, in which the interferometric path difference between the third and fourth path is selected to have a value L2, whereby the effect of laser mode beating is reduced also at the series of frequencies "f2" defined by the expression:

$$f2 = nC/2L2,$$

where
n is any positive integer,
C is the velocity of light, and
L2 is the selected path difference above defined.

3. A laser system as claimed in claim 2, in which the first and second component poloarisation defined by the first optical means is at 45° to the third and fourth component polarisation defined by the second optical means.

4. A three-colour modulated laser source comprising a plurality of laser beam sources a first of said sources defining a first laser system with a first recombined emergent laser beam, as claimed in claim 3, and a second of said sources defining a second laser system, with a second recombined emergent laser beam, as claimed in claim 3, one of said first and second emergent laser beams being split by beam splitting means to travel along two paths, thereby defining first, second and third emergent laser beam paths in all, "Green," "Blue" and "Red" laser beam intensity modulators positioned one in each of said first, second and third emergent beam paths, thereby providing first, second and third modulated laser three-colour components, and beam combining means for combining the first, second and third modulated components into a modulated three-colour beam.

5. A scanned laser projection display system comprising a three-colour modulated laser source as claimed in claim 4, followed by line and frame scanning means for providing a scanned display upon a projection screen.

6. A laser system comprising a laser beam source and an optical system for transmitting the laser beam and comprising a beam splitter for splitting the incident laser beam into two approximately equal components, optical means for directing the two components along optical paths of unequal lengths and a beam combiner for combining the two components, after travel along their unequal length paths, to form a single emergent laser beam, in which the said optical system for transmitting the laser beam comprises a first beam splitter for splitting the incident laser beam into first and second approximately equal components, first optical means for directing the first and second components respectively along first and second optical paths of unequal lengths and a first beam combiner for combining the first and second components, after travel along the first and second respective paths, to form a single first emergent laser beam and at least a second beam splitter for splitting the first emergent laser beam into third and fourth approximately equal components, second optical means for directing the third and fourth components respectively along third and fourth optical paths of unequal lengths and a second beam combiner for combining the third and fourth components, after travel along the third and fourth respective paths, to form a single second emergent laser beam, the difference between the first and second optical paths being unequal to the difference between the third and fourth optical paths.

7. A three-colour modulated laser source comprising a plurality of laser beam sources, a first of said sources defining a first laser system, with a first recombined emergent laser beam, as claimed in claim 6, and a second of said sources defining a second laser system with a second recombined emergent laser beam as claimed in claim 6, one of said first and second emergent laser beams being split by beam splitting means to travel along two paths, thereby defining first, second and third emergent laser beam paths in all, "Green," "Blue" and "Red" laser beam intensity modulators positioned one in each of said first, second and third emergent beam paths, thereby providing first, second and third modulated laser three-colour components, and beam combining means for combining the first, second and third modulated components into a modulated three-colour beam.

8. A scanned laser projection display system comprising a three-colour modulated laser source as claimed in claim 7, followed by line and frame scanning means for providing a scanned display upon a projection screen.

* * * * *